(12) United States Patent
Iwamura (10) Patent No.: US 6,307,139 B1
(45) Date of Patent: Oct. 23, 2001

(54) SEARCH INDEX FOR A MUSIC FILE (75) Inventor: Ryuichi Iwamura, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/567,868

(22) Filed: May 8, 2000

(51) Int. Cl.$^7$ ...................................................... G10H 7/00
(52) U.S. Cl. .................................................. 84/601; 84/609
(58) Field of Search ............................ 84/600–602, 609; 434/307 A (56) References Cited

U.S. PATENT DOCUMENTS

| | | |
|---|---|---|
| 5,402,339 | 3/1995 | Nakashima et al. . |
| 5,670,730 | 9/1997 | Grewe et al. . |
| 5,739,451 | 4/1998 | Winksy et al. . |
| 5,808,224 * | 9/1998 | Kato ........................................ 84/609 |
| 5,864,868 | 1/1999 | Contois . |
| 5,895,876 | 4/1999 | Moriyama et al. . |
| 5,925,843 | 6/1999 | Miller et al. . |
| 5,963,957 * | 10/1999 | Hoffberg . |
| 5,969,283 | 10/1999 | Looney et al. . |
| 5,986,200 | 11/1999 | Curtin . |
| 6,031,174 | 2/2000 | Takabayashi . |

* cited by examiner

Primary Examiner—Jeffrey Donels
(74) Attorney, Agent, or Firm—Blakely, Sokoloff, Taylor & Zafman LLP (57) ABSTRACT

The invention includes a music file that includes a search index and a formatted music data block. The formatted music data block includes a complete formatted musical piece. The information in the search index includes a header data block, one or more melody data blocks, a lyrics data block and an auxiliary data block. The header data block, lyrics data block, and auxiliary data block are plain text data. The melody data block includes a melody that is included in the formatted music data block. The melody included in the formatted music data block may be a part of a melody included in the formatted music data block. The melody data blocks may be integer data, ASCII data or MIDI data. Each data block in the search index may include an identifier and a block size. In an alternative embodiment, the block size information may be included in the header data block. The search index data blocks may include pointers to the musical piece. Also, a method for searching a music file including a search index for a musical piece is presented. The method includes selecting a type of search to perform, either a melody search or a text based search. If the type of search selected is a text based search, then text search input is received from a user. The text based search is then performed on stored music file including the search index. If the type of search selected is a melody-based search, then note information is received representing the melody provided by a user.

36 Claims, 6 Drawing Sheets

FIG. 1

TURKISH MARCH BY BEETHOVEN (1)

FIG. 2

TURKISH MARCH BY BEETHOVEN (2)

FIG. 5 Für Elise — L.v. Beethoven

FIG. 6 Träumerei — R. Schumann, Op.15, No.7

PIANO ROLL WINDOW (FUR ELISE)

FIG. 7

PIANO ROLL WINDOW (TRAUMEREI)

SEARCH INDEX FOR A MUSIC FILE

BACKGROUND OF THE INVENTION

1. Field of the Invention

The present invention is directed to using a search index in a music file.

2. Background Information

With the advent of widespread personal computer use and internet accessibility, EMD (Electronic Music Download) is becoming very popular. A user can retrieve their favorite music immediately over the internet. Downloading of music over the internet is easier and quicker to obtain than conventional media such as compact disc or a cassette tape. The downloaded music can not only be stored and played on a personal computer, but it can also be downloaded onto a personal music playback system, such as Sony's Memory Stick Walkman.

A problem that arises with EDM is how to quickly find the music a user wants to play. An EMD library on a remote host is too large to immediately find the specific music a user wishes to play. Also, after downloading the music to a user's personal computer, again finding the specific music that a user wants to listen to is a problem. Once a user has built up a large library of downloaded music files, the more difficult is to find the specific music file a user wishes to listen to.

One way to alleviate the problem of finding a specific music file is to search by a melody as illustrated by the filed U.S. patent application Ser. No. 09/429,260, filed on Oct. 29, 1999. The music, however, is stored in one file and the index is stored in another file. Therefore, a problem arises after the music file is downloaded. Since the index file remains on the remote database, a user cannot use the search function in the client computer after the music file is downloaded. Therefore, a problem exists with portability of music files for searching capabilities.

SUMMARY

The invention includes a music file that includes a search index and a formatted music data block. The formatted music data block includes a complete formatted musical piece. The search index includes information relative to the formatted musical piece. The information in the search index includes a header data block, one or more melody data blocks, a lyrics data block and an auxiliary data block. The header data block, lyrics data block, and auxiliary data block are plain text data. The header data block includes a title to the musical piece, composer information, and performer information. The melody data block includes a melody that is included in the formatted music data block. The melody included in the formatted music data block may be a part of a melody included in the formatted music data block. The melody data blocks may be integer, ASCII or MIDI data. In the case of the melody data block being in integer or ASCII format, the data includes pitch and duration note information.

The lyrics data block includes part or all of the lyrics to the musical piece. The auxiliary data block includes information such as a composer's profile, and background information regarding the musical piece. Each data block in the search index may include an identifier and a block size. In an alternative embodiment, the block size information may be included in the header data block. The search index data blocks may include pointers to the musical piece, which a user could jump to a part of the musical piece that is referred to.

Also, a method for searching a music file including a search index for a musical piece is presented. The method includes selecting a type of search to perform, either a melody search or a text based search. If the type of search selected is a text based search, then text search input is received from a user. The text based search is then performed on stored music file including the search index. If the type of search selected is a melody-based search, then note information is received representing the melody provided by a user.

DETAILED DESCRIPTION

Referring to the figures, exemplary embodiments of the invention will now be described. The exemplary embodiments are provided to illustrate the invention and should not be construed as limiting the scope of the invention.

Figure 1:
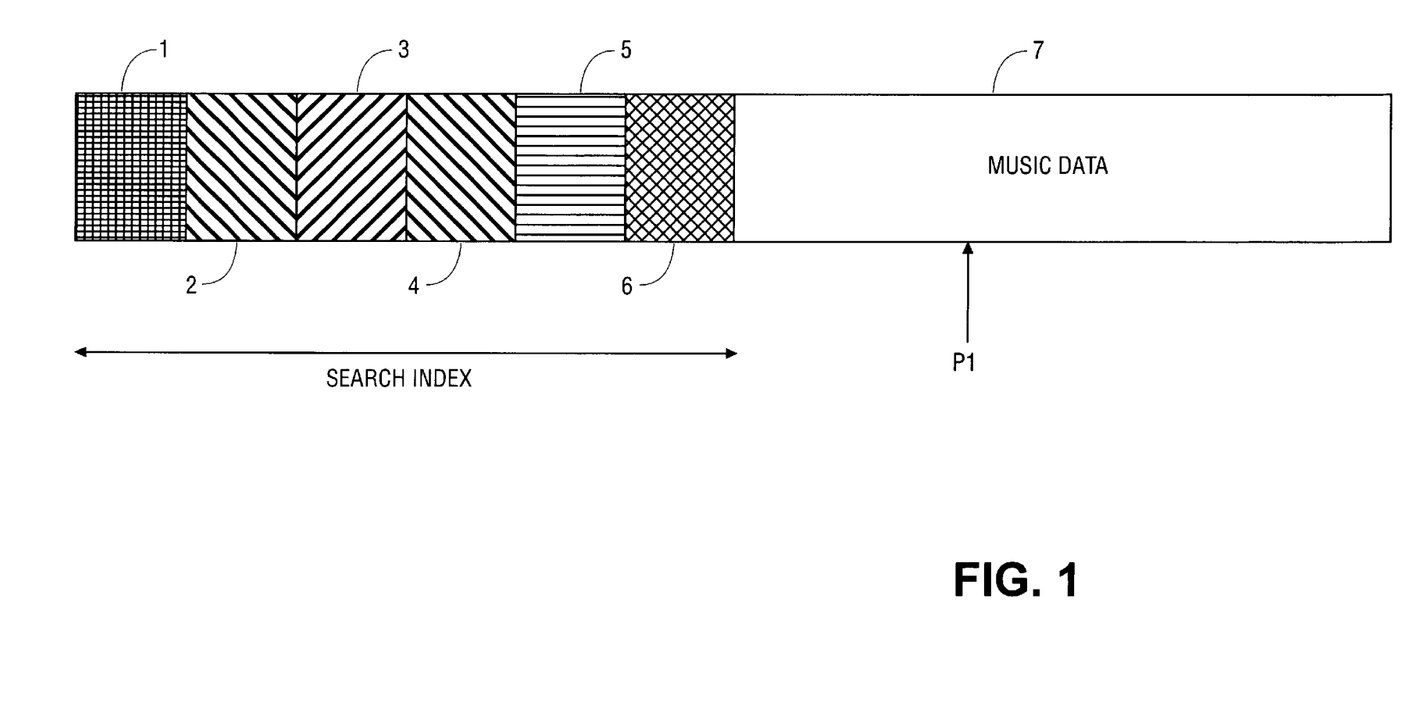
FIG. 1 illustrates a music file with a search index.

FIG. 1 illustrates the invention's music file including a search index. Header 1 includes information such as a title to the music file, a composer, a performer, etc. Music data 7 is actual music data. Music data 7 is encoded in a playable format, such as MP3 format. Following Header 1, the search index includes a plurality of melody data blocks 2–4, a lyrics data block 5 and an auxiliary data block 6. Each data block has an identifier (not shown) and block data size (not shown) included at the beginning of the data block. Alternatively, Header 1 may include the identifier and the block data size of each block. The identifier indicates the type of data block, either melody, lyrics, or auxiliary data. The block data size may be used to skip to the beginning of the next block when the current block is unnecessary to read. Most of existing prior art music files consist of only header 1 and music data 7.

Figure 2:
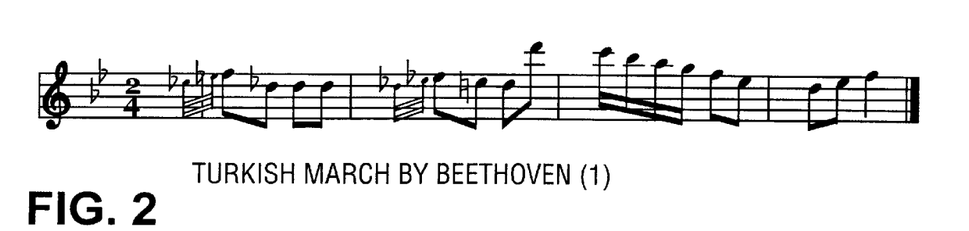
FIG. 2 illustrates a portion of Turkish March by L. V. Beethoven.
Figure 3:
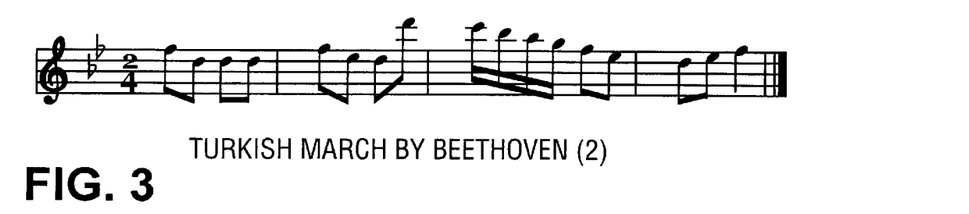
FIG. 3 illustrates a portion of Turkish March by L. V. Beethoven that is simplified.

The melody data blocks 2–4 include note pitch and duration of well-known or outstanding segments of the melody in a music file. In one embodiment, pitch and duration of each note is represented as 1-byte data. Pitch and duration of each note is handled as integer or ASCII data. In an alternate embodiment, the melody data blocks may be MIDI files. Since the MIDI format is common to most personal computers (PCs), most PCs can play back the melody. A MIDI file, however, is not a simple series of integers or ASCII data. Therefore, the use of MIDI files require parsing of the data to extract pitch and duration data. Once the pitch and duration data are extracted, they can then be handled as in the case of integer or ASCII data. The parsing of the MIDI files, therefore, would be additional overhead in a search. The melody may be several-bars long and the data size may be several k-bytes. As illustrated in FIG. 1, three melodies, melody (A) 2, melody (B) 3, and melody (C) 4, are included in the music file. The music file may, however, include more or less melody data blocks. Melody (A) 2, melody (B) 3, and melody (C) 4, may be different melodies included in the same music. However, the melody data blocks 2–4 may be variations of original melodies in the music. FIG. 2 is an example of an original melody of Beethoven's Turkish March. FIG. 3 is a simplified variation of the melody illustrated in FIG. 2 with no grace notes. Since a user may not be able to enter an exact melody included in original music, by including a simplified melody, greater input fault tolerance is given to a user. By using simplified variations of original melodies, a user may more easily obtain a correct search result.

Lyrics data block 5 is plain text data. Lyrics data block 5 may include all of the lyrics of the music or a part of the lyrics of the music, such as a most memorable part of a song.

Auxiliary data block 6 is plain text data. The auxiliary data block 6 may include a composer's profile, background information of the music, etc.

The search index uses pointers to the music data block that are included in the other data blocks. All of the data blocks included in the search index may include address pointers to music data block 7. For example, assume the music contained in the data is a symphony. The second movement of the symphony can be stored in the Melody (A) data block 2. The melody (A) data block 2 may include a pointer (not shown) to P1, which is an address where the second movement begins in music data block 7. After a user obtains melody (A) 2 as a result of a search, if the user enters a command to jump to the part of the symphony where melody (A) 2 begins, the second movement will immediately be played. Lyrics data block 5 may also include a pointer to an address in music data block 7 where particular lyrics begin. Also, auxiliary data block 6 may include a pointer to music data block 7. For example, an explanation about the second movement of a symphony can include a pointer to P1. A user, after reading the explanation, can enter a command to jump to the beginning of the second movement in the music data block 7.

Figure 4:
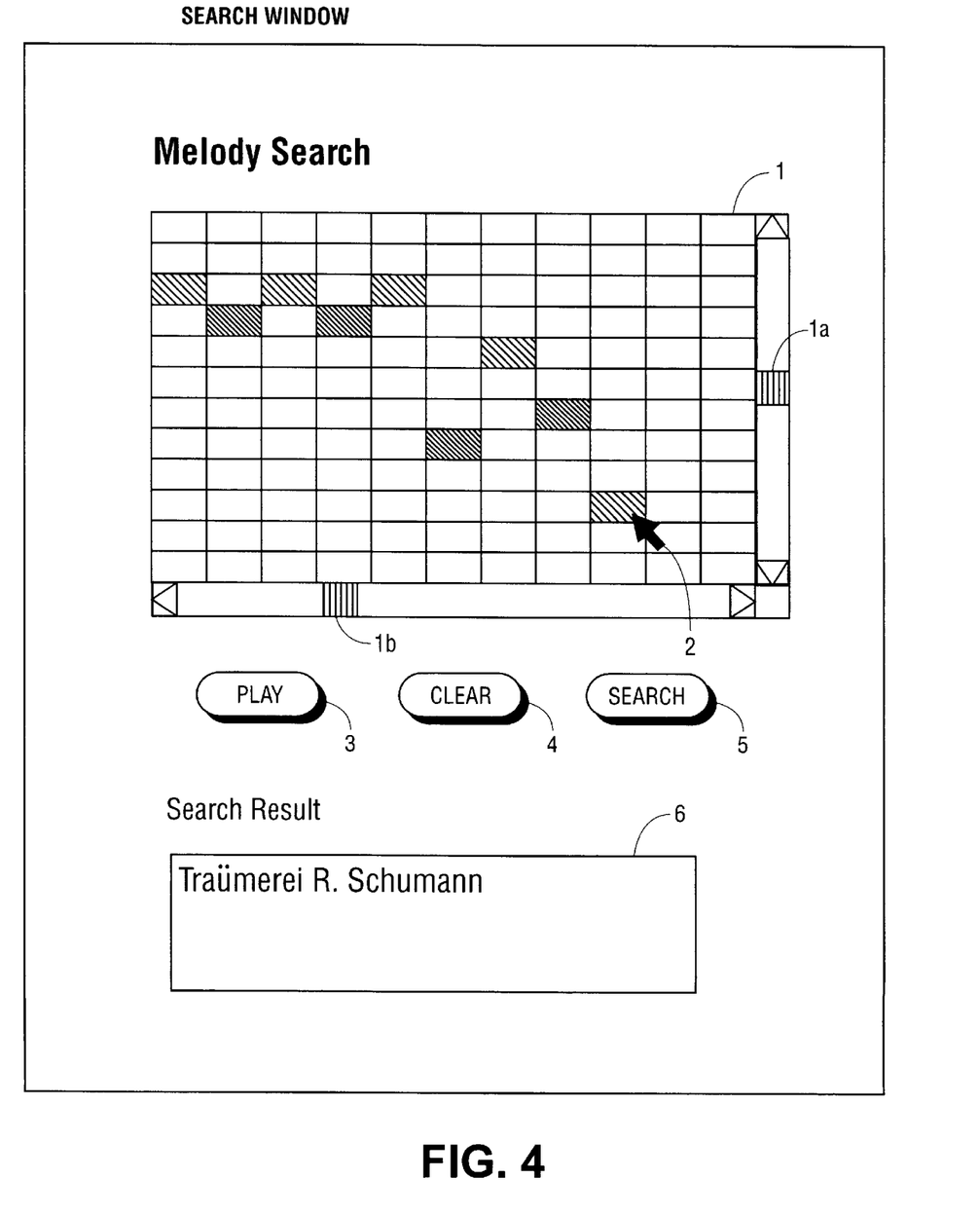
FIG. 4 illustrates a piano roll grid onto which a melody may be entered.

If the melodies are stored in integer or ASCII data formats, a user would have to convert the melody to be searched into ASCII or integer data. This is not a simple task for a user to perform. Therefore, several melody input methods are introduced, which allow a user to easily enter a melody to be searched. FIG. 4 shows an example of a melody search interface disclosed in U.S. patent application Ser. No. 09/429,260, that may be used with the present invention. The interface includes piano roll grid 1, mouse or other pointing device cursor 2, play button 3, clear button 4, search button 5, and search result window 6. Piano roll grid 1 has vertical scroll button 1a and horizontal scroll button 1b. Even if a user does not know traditional musical notation, with this piano roll input, the user can easily input a melody to search. This kind of music input interface is already used in existing music notation software. For example, a commercially available product known as Midisoft Studio 6.0 uses a piano roll input interface. See, http://www.midisoft.com/upgrade.htm. In this case, however, the interface is used to create and edit music rather than to perform searches.

The horizontal axis of the grid represents time and the vertical axis of the grid indicates pitch. Each block represents a note. One block above represents a half note. If the current block is C, its upper block is C#.

The user moves cursor 2 to a block to select it and then presses the mouse button. If the selected box pitch is C4, a tone of C4 will be generated by the soundcard of the PC and the user hears the tone. This tone feedback allows the user to correct the pitch easily. If the pitch is correct, the user releases the mouse button and that block is fixed. If the pitch is wrong, the user moves cursor 2 upward or downward to find the correct pitch. To correct a fixed block, the user moves the cursor onto the block and drags-and-drops it onto another block to correct the pitch. By dragging cursor 2 to the right, the user can prolong the duration of a note.

When the user finishes the melody input, play button 3 is clicked. The whole melody which has been entered is generated by the soundcard in the PC and is heard through connected speakers. If the melody is correct, search button 5 is selected to start the search. If the user wants to delete all entries made in the piano roll grid, clear button 4 is clicked.

Figure 5:
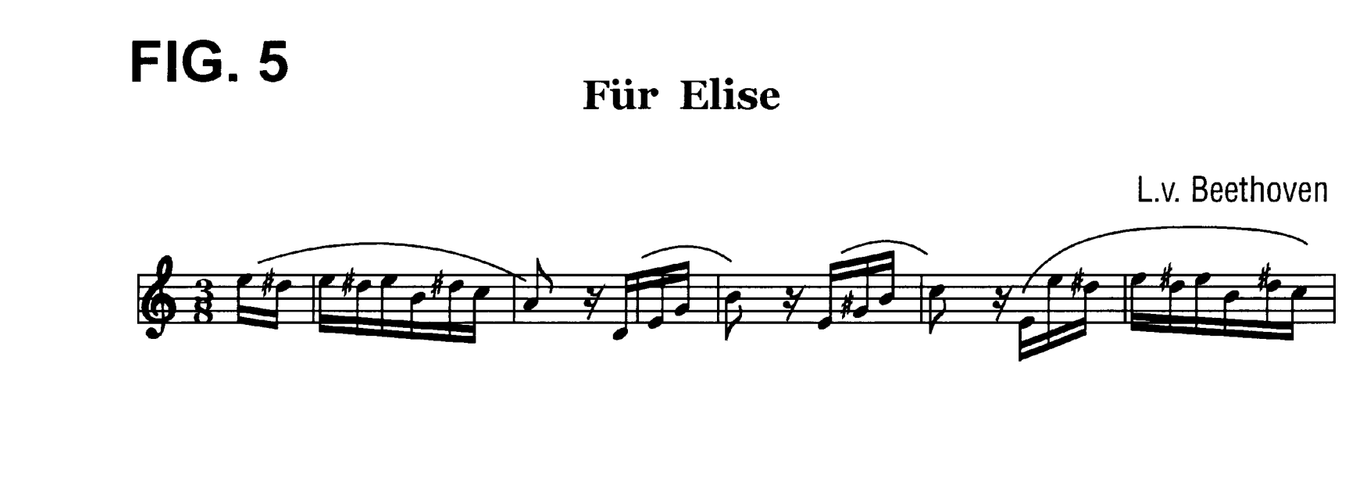
FIG. 5 is a portion of the work Für Elise in standard music notation.
Figure 6:
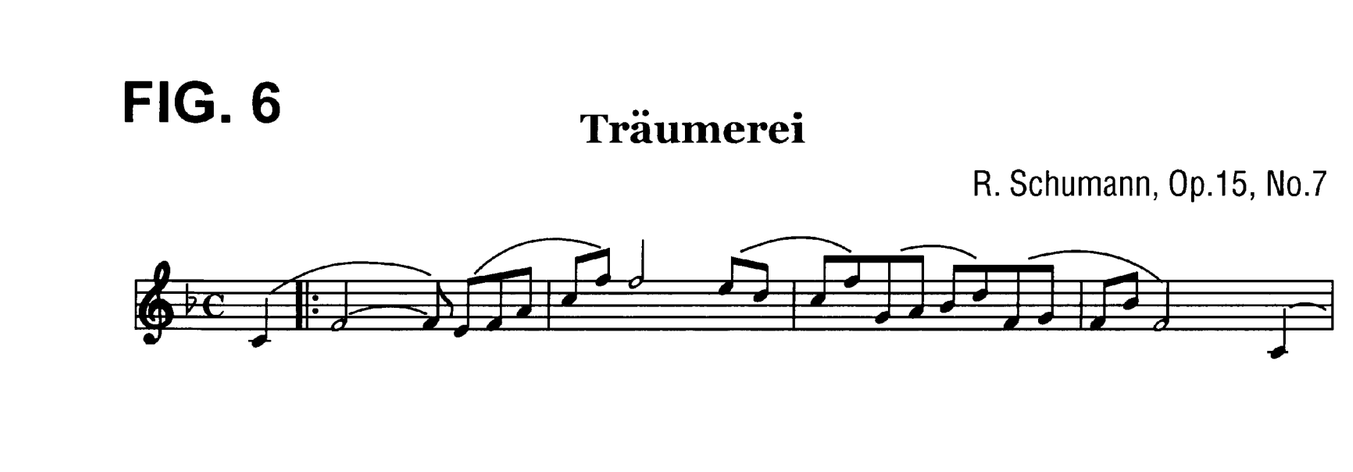
FIG. 6 is a portion of the work Traümerei in standard music notation.
Figure 7:
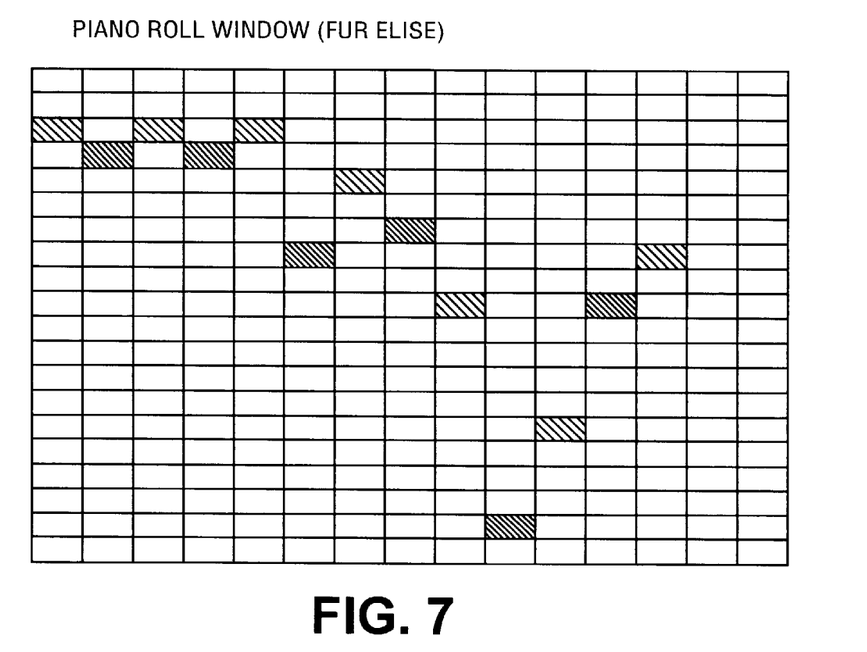
FIG. 7 illustrates a piano roll window for the melody (Für Elise) shown in FIG. 5.
Figure 8:
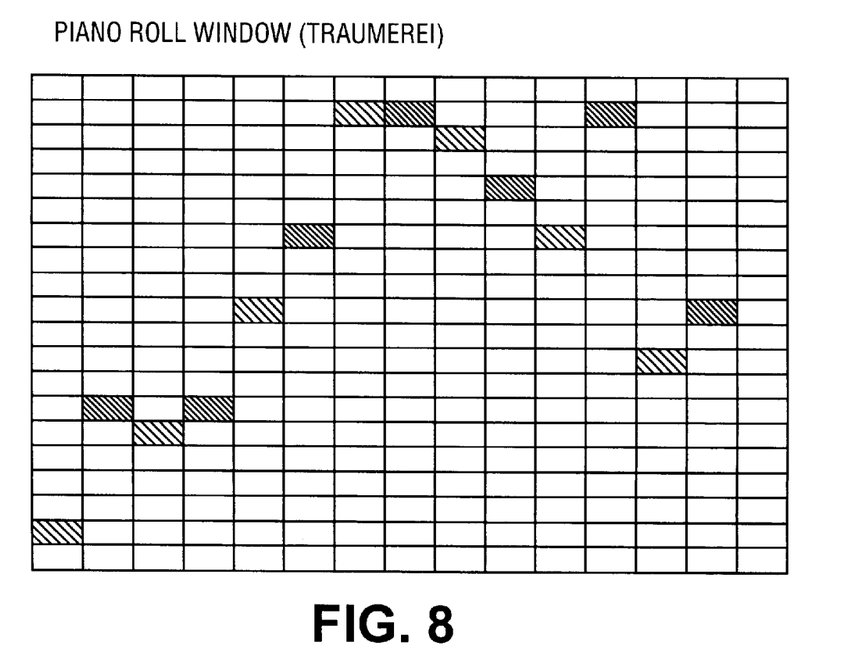
FIG. 8 illustrates a piano roll window for the melody (Traümerei) shown in FIG. 6.

FIG. 5 is the famous melody in "Für Elise" by L. V. Beethoven. FIG. 7 shows an example of piano roll notation for "Für Elise." FIG. 6 is another example melody, "Tra ümerei" by R. Schumann. FIG. 8 is the piano roll notation for this melody. The user may input the melody in any key. The invention automatically shifts its key to fit the database as described in detail below. The user need only be concerned with pitch distance between each note.

Figure 9:
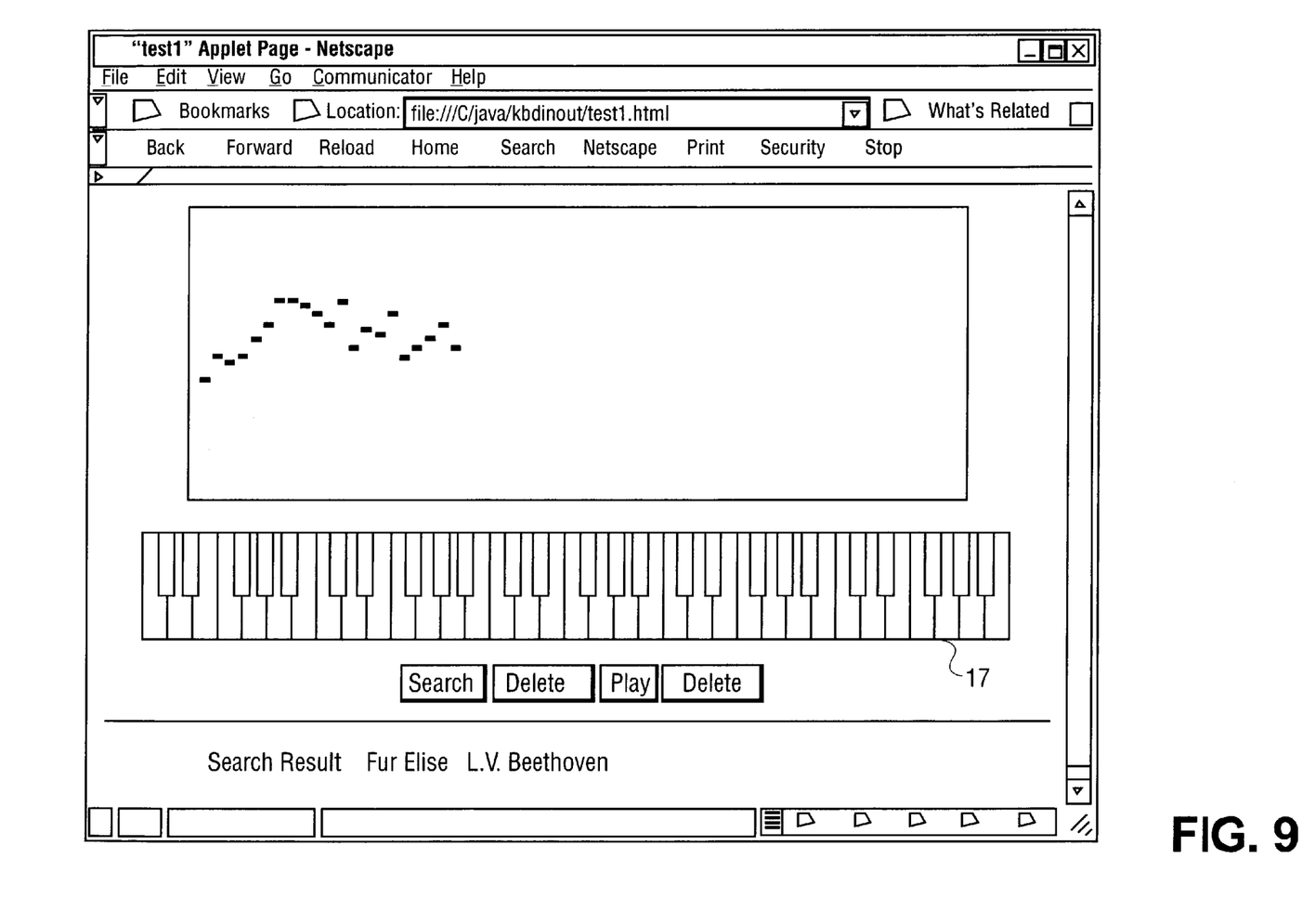
FIG. 9 illustrates an alternate interface for inputting a melody using a representation of a piano keyboard.

For those who are familiar with music notation, there are alternative methods. A piano keyboard and a music sheet are displayed as shown in FIG. 9. The user chooses a key on keyboard 17 by pointing to the desired key with a cursor and clicking a mouse button. A corresponding note appears on the sheet 19. This kind of traditional input method may alternatively be employed. In this case, if a MIDI instrument is available, for example, a MIDI keyboard, it may be connected to the PC, and the user may enter a melody from the keyboard.

The keyboard (or piano grid) interface may be used for on-line access. In order to generate a tone of each piano key, the network server sends the sound files to the client computer over the network. The client computer does not have to store the sound files. They will be sent on demand in the preferred embodiment. There are several choices for sound files. One is a MIDI data file. The MIDI file has only pitch and duration values. So its size is very compact. It can be accessed over a network relatively quickly. A disadvantage is that the client computer must have a MIDI sound generator. Most UNIX computers have no MIDI generator. Thus, although a MIDI file is small, using MIDI limits the number of clients that can be used. Another solution is a waveform file like a .au or .wav file which are well known sound file formats. Each waveform file is several Kbytes. 60-key data is about 250 Kbytes. It is larger than a MIDI file and thus take s more time to send. However, no MIDI sound generator is required. Compared with a MIDI file, more clients can handle the waveform files.

Instead of a keyboard or piano grid input interface, a microphone can be used. The microphone receives the user's voice (e.g., by humming) and converts it to an electronic signal. The signal is amplified and analog-to-digital converted. The digitized signal is analyzed in a CPU by a FFT (Fast Fourier Transform) algorithm according to well known techniques in which FFT is used to analyze sound by obtaining frequency spectrum information from waveform data. The frequency of the voice is obtained and finally a musical note that has the nearest pitch is selected.

This kind of interface is already in practical use. For example, the following web pages describe software products with such an interface.

http://www.medianavi.co.jp/product/hana/tk9907.html
http://www.medianavi.co.jp/product/hana/step.html
http://www.medianavi.co.jp/product/hana/step2.html
http://www.medianavi.co.jp/product/hana/step3.html To search lyrics data blocks 5 or auxiliary data blocks 6, a user can use a typical keyboard. Alternatively, speech recognition software may be used with a microphone, e.g. IBM's Via Voice can be used. A speech recognition interface may be used whenever a keyboard is not connected to a system, e.g., a karaoke machine. Simple text searching mechanisms may be employed once the user enters the data by remote-access. Since lyric data, auxiliary data and header information are text data, once a music file of the invention is downloaded to a client system, a PC for example, simple text searches may be performed using any client based text search mechanism. Also, after music files are downloaded onto a personal music playback system, such as Sony's Memory Stick Walkman, simple text search mechanisms can be introduced to perform text-based searches of the music files.

A composer's name, title, performers, background information and a plurality of melodies and/or variations of melodies are contained within the music file.

The melody data may be stored in a MIDI format. When a melody is searched for, the melodies are extracted from the music file and compared with the input melody. If search speed does not matter, this is a good solution because the user listens to the searched music by playing the MIDI formatted music data. If a text base search is performed, the music file is searched, e.g., lyrics data, auxiliary data or melody data (if in integer or ASCII format), using a conventional string search algorithm. For example, a Boyer-Moore algorithm may be used. For a lyrics based search, only the lyrics data block 5 is searched. For an auxiliary based search, only auxiliary data block 6 is searched. For melody search, only melody block data is searched. The block data size is used to skip the unnecessary blocks.

The melody stored in the music file could not only be the melody at the beginning of the music, but a famous part of the music that is contained in the middle of the music.

The peak search technique, disclosed in U.S. patent application Ser. No. 09/429,260, which is applicable to searching melodies, may be used to perform a melody search of a music file with the present invention's search index.

A musical note can be represented as an integer like an ASCII character. Therefore, melody data can be handled in the same manner as a character string. Fundamentally, a melody search is equivalent to a string search. Of course, however, a key-shift is required for a melody search. There are many studies for fast and efficient string search techniques. For example, the Boyer-Moore algorithm is well known as one of the best solutions. See http://orca.st.usm.edu/~suzi/
http://www-igm.univ-mlv.fr/~mac/DOC/B5-survey.html#pm.

These search algorithms may be applied not only to perform a string search, but also to perform melody searches.

A user may use the invention in the following scenarios. One scenario may be a remote-access music database on a network, for example the Internet. The user would access the music database, consisting of music files, from a remote client machine, for example a personal computer. The user would then enter a keyword or a melody to search for in the music database. The search result would be returned to the user. The melody input interface may be a Java applet as described U.S. patent application Ser. No. 09/429,260. The user would not be required to install specialized software to enter the melody on the network.

Another scenario may be that a user has already downloaded a plurality of music files from a network, such as the Internet, to his or her own device, for example a personal computer. The user may want to search on there own device for a specific music file. Similar input interfaces as described above may be used to search for the specific music file. In this scenario, the user would not have to send a keyword or melody over a network to receive a search result.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An article for storing data for access by an application program being executed on a computer system, comprising:
a data structure stored in the article, the data structure containing information relating to a single musical piece including a search index and a formatted music data block used by the application program, wherein said formatted music data block having a single complete formatted musical piece, and said search index including information relative to said single complete formatted musical piece.

2. The article of claim 1, wherein each of said header data block, said at least one melody data block, said lyrics data block and said auxiliary data block includes a data block size.

3. The article of claim 1, wherein said header data block comprises a data block size for each of said header data block, said at least one melody data block, said lyrics data block, and said auxiliary data block.

4. The article of claim 1, wherein said header data block includes a pointer to said formatted music data block.

5. The article of claim 1, wherein said at least one melody data block includes a pointer to said formatted music data block.

6. The article of claim 1, wherein said lyrics data block includes a pointer to said formatted music data block.

7. The article of claim 1, wherein said auxiliary data block includes a pointer to said formatted music data block.

8. The article of claim 1, wherein each of said header data block, said at least one melody data block, said lyrics data block and said auxiliary data block includes a identifier.

9. The article of claim 1, wherein said header data block, said lyrics data block, and said auxiliary data block are text data.

10. The article of claim 9, wherein said header block comprises,
a title to said musical piece, composer information, and performer information.

11. The article of claim 9, wherein said at least one melody data block comprises a melody included in said formatted music data block.

12. The article of claim 11, wherein said melody included in said formatted music data block is a partial melody of a melody included in said formatted music data block.

13. The article of claim 9, wherein said at least one melody data block is one of integer and ASCII data.

14. The article of claim 13, wherein said at least one melody data block comprises
a plurality of musical note data, wherein said plurality of musical note data comprises note pitch and note duration.

15. The article of claim 13, wherein said note pitch and said note duration of a note is represented as one-byte data.

16. The article of claim 15, wherein said at least one melody data block comprises a melody included in said formatted music data block.

17. The article of claim 9, wherein said at least one melody data block is MIDI data.

18. The article of claim 17, wherein said melody included in said formatted music data block is a partial melody of a melody included in said formatted music data block.

19. The article of claim 9, wherein said lyrics data block includes a complete collection of lyrics included in said complete formatted musical piece.

20. The article of claim 9, wherein said auxiliary data block comprises a composer's profile.

21. The article of claim 9, wherein said lyrics data block includes a partial collection of lyrics included in said complete formatted musical piece.

22. The article of claim 21, further comprising a background of said complete formatted musical piece.

23. The article of claim 22, wherein each of said header data block, said at least one melody data block, said lyrics data block and said auxiliary data block includes a data block size.

24. A method for searching a music file including a search index for a musical piece comprising the steps of:
selecting a type of search to perform, wherein said type of search comprises one of a melody search and a text based search;
if said type of search selected is a text based search, then perform receiving text search input from a user;
perform text based searching of at least one stored music file including said search index, wherein said search index comprises a header data block, at least one melody data block, a lyrics data block, and an auxiliary data block;
if said type of search selected is a melody-based search, then perform receiving note information representing the melody provided by a user.

25. The method of claim 24, wherein said note information is received from a user based on a piano roll grid interface in which cells within an array represent pitch values and are selected by a user using a pointing device.

26. The method of claim 24, wherein said note information is received from a user based on a piano keyboard grid interface in which keys on a piano keyboard represent pitch values and are selected by a user using a pointing device.

27. The method of claim 24, wherein said note information is received from a user based upon sounds input to a microphone representing the melody.

28. The method of claim 24, further comprising the step of playing said note information for verification of its correctness.

29. The method of claim 24, further comprising the step of playing the selected musical piece.

30. The method of claim 24, wherein said received text search input from a user is entered through a keyboard.

31. The method of claim 24, wherein said received text search input from a user is entered through a microphone.

32. The method of claim 31, further comprising the step of converting said received input text search input from a user entered through a microphone to text data.

33. The method of claim 24, wherein searching a music file is performed remotely through a server.

34. The method of claim 24, wherein searching a music file is performed on a client based system.

35. The method of claim 24, further comprising the step of jumping to a part of said musical piece if a music file is found containing user text based search input; and playing said part of said musical piece.

36. The method of claim 24, further comprising the step of parsing said at least one melody data block if said at least one melody data block is of a MIDI format.

* * * * *